US008457848B2

(12) United States Patent
Eastman et al.

(10) Patent No.: US 8,457,848 B2
(45) Date of Patent: *Jun. 4, 2013

(54) WORK MACHINE WITH IVT OUTPUT AUTOMATICALLY ADJUSTED DEPENDENT UPON ENGINE LOAD

(75) Inventors: Briton Todd Eastman, Coffeyville, KS (US); Clayton George Janasek, Independence, KS (US)

(73) Assignee: Deere & Company, Moline, IL (US)

( * ) Notice: Subject to any disclaimer, the term of this patent is extended or adjusted under 35 U.S.C. 154(b) by 990 days.

This patent is subject to a terminal disclaimer.

(21) Appl. No.: 11/930,669

(22) Filed: Oct. 31, 2007

(65) Prior Publication Data
US 2009/0112413 A1  Apr. 30, 2009

(51) Int. Cl.
*G06F 7/00* (2006.01)

(52) U.S. Cl.
USPC .............................. 701/54; 477/115

(58) Field of Classification Search
USPC ...... 701/1, 50, 51, 53–56, 58, 65, 49; 477/34, 477/37, 42, 43, 97, 115, 902; 172/2, 3, 7, 172/8, 12, 4.5, 9
See application file for complete search history.

(56) References Cited

U.S. PATENT DOCUMENTS

| | | | | |
|---|---|---|---|---|
| 4,428,257 A * | 1/1984 | Meyerle et al. | ................. | 477/40 |
| 4,476,530 A * | 10/1984 | Pannier et al. | ................. | 701/62 |
| 4,486,838 A * | 12/1984 | Itoh et al. | ........................ | 701/66 |
| 4,669,334 A * | 6/1987 | Miyaura et al. | ................. | 477/50 |
| 4,672,864 A * | 6/1987 | Morimoto | ....................... | 477/39 |
| 4,740,898 A * | 4/1988 | McKee et al. | ................... | 701/70 |
| 4,885,690 A * | 12/1989 | Schimmel et al. | .............. | 701/54 |
| 4,930,078 A * | 5/1990 | Dunkley et al. | ................. | 701/52 |
| 5,129,288 A * | 7/1992 | Sasaki et al. | ................... | 477/120 |
| 5,152,191 A * | 10/1992 | Sato et al. | ........................ | 477/36 |
| 5,257,193 A * | 10/1993 | Kusaka et al. | ................ | 701/110 |
| 5,514,046 A * | 5/1996 | Petersmann et al. | ............ | 477/39 |
| 5,575,737 A | 11/1996 | Weiss | | |
| 5,967,756 A | 10/1999 | Devier et al. | | |
| 6,188,944 B1 * | 2/2001 | Kolmanovsky et al. | ........ | 701/54 |
| 6,247,378 B1 | 6/2001 | Newendorp et al. | | |
| 6,249,727 B1 * | 6/2001 | Muller | ............................ | 701/36 |
| 6,249,733 B1 * | 6/2001 | Smith | ............................. | 701/50 |
| 6,405,844 B1 | 6/2002 | Takamatsu | | |
| 6,546,705 B2 * | 4/2003 | Scarlett et al. | .................. | 701/50 |
| 6,553,302 B2 * | 4/2003 | Goodnight et al. | ............. | 701/54 |
| 6,599,220 B2 * | 7/2003 | Narita et al. | .................... | 477/37 |
| 6,601,442 B1 * | 8/2003 | Decker et al. | ............. | 73/114.15 |

(Continued)

OTHER PUBLICATIONS

European Search Report, 6 pages, Aug. 8, 2010.

*Primary Examiner* — Gertrude Arthur Jeanglaude

(57) ABSTRACT

A work machine includes an internal combustion (IC) engine, and an infinitely variable transmission (IVT) coupled with the IC engine. At least one sensor provides an output signal representing a real-time load value on the IC engine. At least one electrical processing circuit is configured for controlling an output of the IVT, dependent upon a threshold load value for the IC engine and the real-time load value for the IC engine. In one embodiment, the at least one electrical processing circuit includes an engine control unit (ECU) associated with the IC engine, and a transmission control unit (TCU) associated with the IVT. The ECU provides an output signal to the TCU representing the real-time load value. The TCU controls the output of the IVT dependent upon a comparison between the threshold load value and the real-time load value.

14 Claims, 3 Drawing Sheets

U.S. PATENT DOCUMENTS

| | | | |
|---|---|---|---|
| 6,665,601 B1 * | 12/2003 | Nielsen | 701/50 |
| 6,842,689 B2 * | 1/2005 | Andres et al. | 701/110 |
| 6,950,735 B2 | 9/2005 | Kilworth et al. | |
| 6,990,400 B2 | 1/2006 | Kilworth et al. | |
| 7,146,263 B2 * | 12/2006 | Guven et al. | 701/54 |
| 7,588,118 B2 * | 9/2009 | Sawada | 180/302 |
| 8,070,651 B2 * | 12/2011 | Eastman et al. | 477/68 |
| 2005/0071067 A1 | 3/2005 | Guven et al. | |

* cited by examiner

WORK MACHINE WITH IVT OUTPUT AUTOMATICALLY ADJUSTED DEPENDENT UPON ENGINE LOAD

FIELD OF THE INVENTION

The present invention relates to work machines, and, more particularly, to work machines including an internal combustion engine coupled with an infinitely variable transmission.

BACKGROUND OF THE INVENTION

A work machine, such as a construction work machine, an agricultural work machine or a forestry work machine, typically includes a prime mover in the form of an internal combustion (IC) engine. The IC engine may either be in the form of a compression ignition engine (i.e., diesel engine) or a spark ignition engine (i.e., gasoline engine). For most heavy work machines, the prime mover is in the form of a diesel engine having better lugging, pull-down and torque characteristics for associated work operations.

The step load response of an IC engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, nitrous oxides (NOx), etc.), noise or vibrations. The load impact may be the result of a drivetrain load (e.g., an implement towed behind the work machine) or an external load (e.g., an auxiliary hydraulic load such as a front end loader, backhoe attachment, etc.)

Engine systems as a whole react in a linear manner during the application of a transient load. Initially, the load is applied to the drive shaft of the IC engine. The IC engine speed decreases when the load increases. The engine speed drop is influenced by whether the governor is isochronous or has a speed droop. The air flow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

An IC engine may be coupled with an infinitely variable transmission (IVT) which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

A work machine including an IC engine coupled with an IVT may exhibit problems to be overcome in two ways: First, sudden loads placed on the drivetrain or vehicle hydraulic functions cause the engine speed to decrease. The response time to change the IVT ratio to reduce engine load once decreased is slower than necessary to prevent substantial engine speed drop and sometimes stall. Second, when an external load is applied to the IC engine, such as when filling the bucket of a front end loader on an IVT vehicle, the operator may command a vehicle speed substantially more than what is capable from the IC engine. Under these conditions the IVT output torque and speed may result in excessive wheel slippage and other undesirable characteristics. Likewise, if an external load from another external function to the transmission is activated, such as hydraulic functions, the external load combined with the transmission output capability may place the engine in an overload condition.

What is needed in the art is a work machine and corresponding method of operation allowing an IVT output to be adjusted so that an overload condition on the IC engine is avoided.

SUMMARY OF THE INVENTION

The invention in one form is directed to a work machine, including an IC engine, and an IVT coupled with the IC engine. At least one sensor provides an output signal representing a real-time load value on the IC engine. At least one electrical processing circuit is configured for controlling an output of the IVT, dependent upon a threshold load value for the IC engine and the real-time load value for the IC engine.

The invention in another form is directed to a method of operating a work machine including an IC engine coupled with an IVT. The method includes the steps of: establishing a threshold load value corresponding to a maximum allowable load on the IC engine; determining a real-time load value associated with the IC engine; comparing the real-time load value with the threshold load value; and controlling an output of the IVT, dependent upon the comparing step.

DETAILED DESCRIPTION OF THE INVENTION

Figure 1:
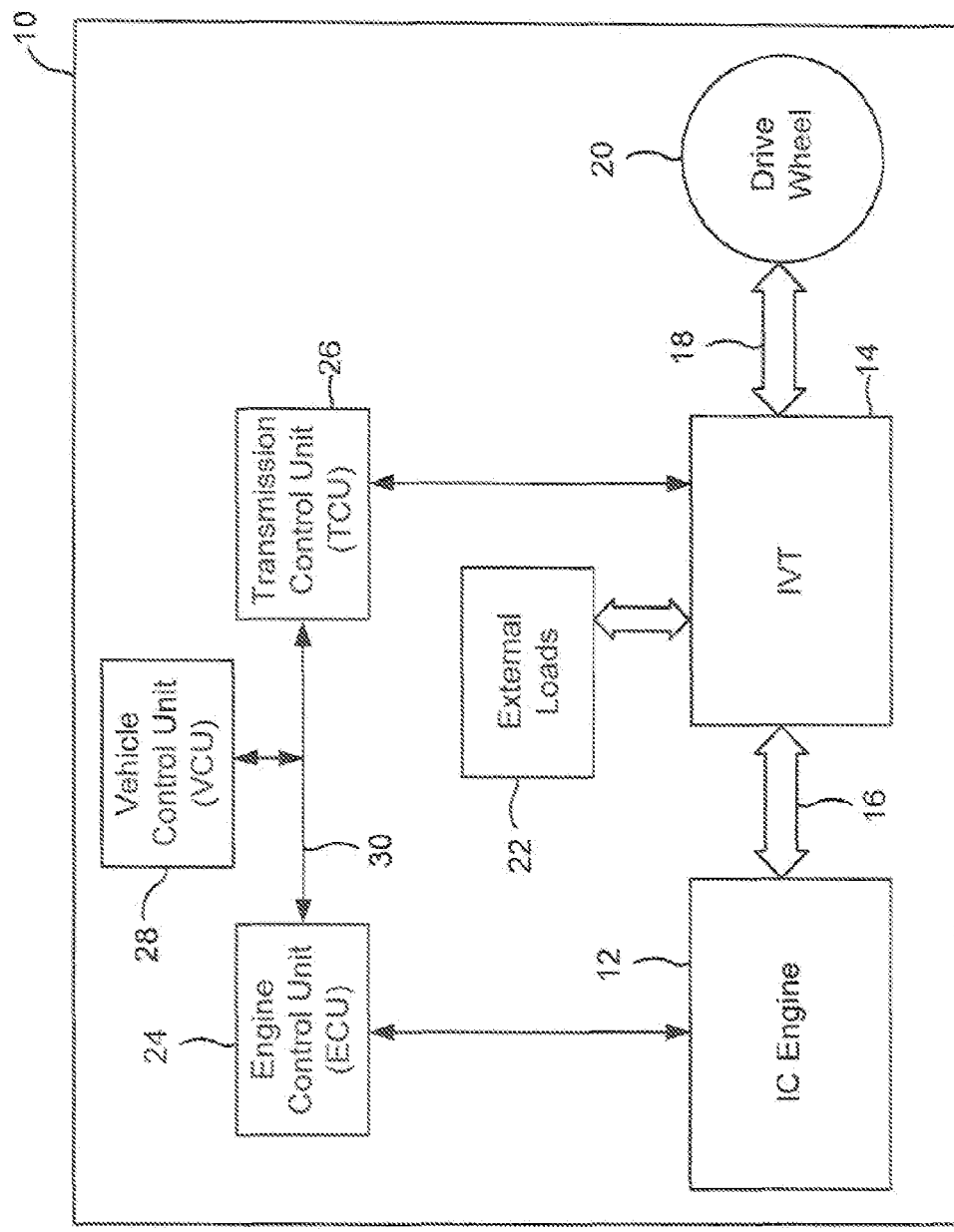
FIG. 1 is a schematic illustration of an embodiment of a work machine of the present invention.

Referring now to FIG. 1, there is shown a schematic illustration of an embodiment of a work machine 10 of the present invention. Work machine 10 is assumed to be a construction work machine such as a John Deere front end loader, but could be a different type of work machine such as an agricultural, forestry, mining, or industrial work machine.

Work machine 10 includes an IC engine 12 which is coupled with an IVT 14, typically through an output crankshaft 16 from IC engine 12. IC engine 12 is assumed to be a diesel engine in the illustrated embodiment, but could also be a gasoline engine, propane engine, etc. IC engine 12 is sized and configured according to the application.

IVT 14 may be of conventional design, and thus is not described in great detail herein. IVT 14 has an output which is coupled with at least one other downstream drive train component 18, which in turn is coupled with a plurality of drive wheels 20, one of which is shown in FIG. 1. Of course, it will be appreciated that in the case of a track-type work vehicle, drive train component 18 may be coupled with a ground engaging track.

IVT 14 also provides output power to one or more external loads 22, which in turn thus provide an additional load on IC engine 12. External loads 22 typically are in the form of hydraulic loads, such as a front end loader, back hoe boom, grain unloading auger, tree felling saw motor, etc. The total load placed upon IC engine 12 thus is a function of both tractive loads and external hydraulic loads.

Engine control unit (ECU) 24 electronically controls operation of IC engine 12, and is coupled with a plurality of sensors (not specifically shown) associated with operation of IC engine 12. For example, ECU 24 may be coupled with a sensor indicating engine control parameters such as an air flow rate within one or more intake manifolds, engine speed, fueling rate and/or timing, exhaust gas recirculation (EGR) rate, turbocharger blade position, etc. Additionally, ECU 24 may receive output signals from vehicle control unit 28 representing vehicle control parameters input by an operator, such as a commanded ground speed (indicated by a position of the gear shift lever and throttle and/or hydrostat lever) or a commanded direction of work machine 10 (indicated by an angular orientation of the steering wheel).

Similarly, transmission control unit (TCU) 26 electronically controls operation of IVT 14, and is coupled with a plurality of sensors associated with operation of IVT 14. ECU 24 and TCU 26 are coupled together via a bus structure providing two-way data flow, such as controller area network (CAN) bus 30.

Although the various electronic components such as ECU 24, TCU 26 and VCU 28 are shown coupled together using wired connections, it should also be understood that wireless connections may be used for certain applications.

Figure 2A:
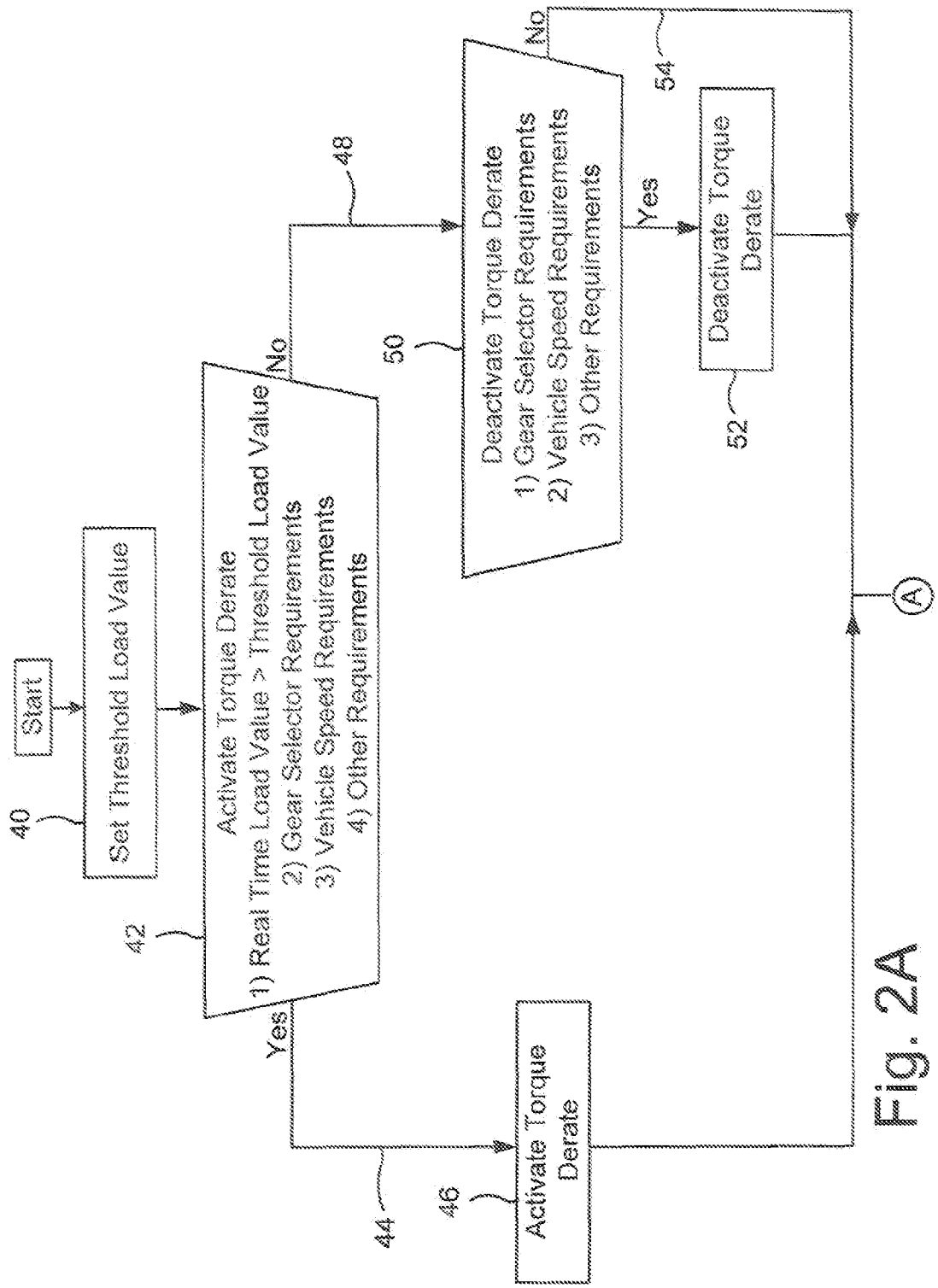
FIGS. 2A and 2B illustrate a flowchart of an embodiment of the method of operation of a work machine of the present invention.
Figure 2B:
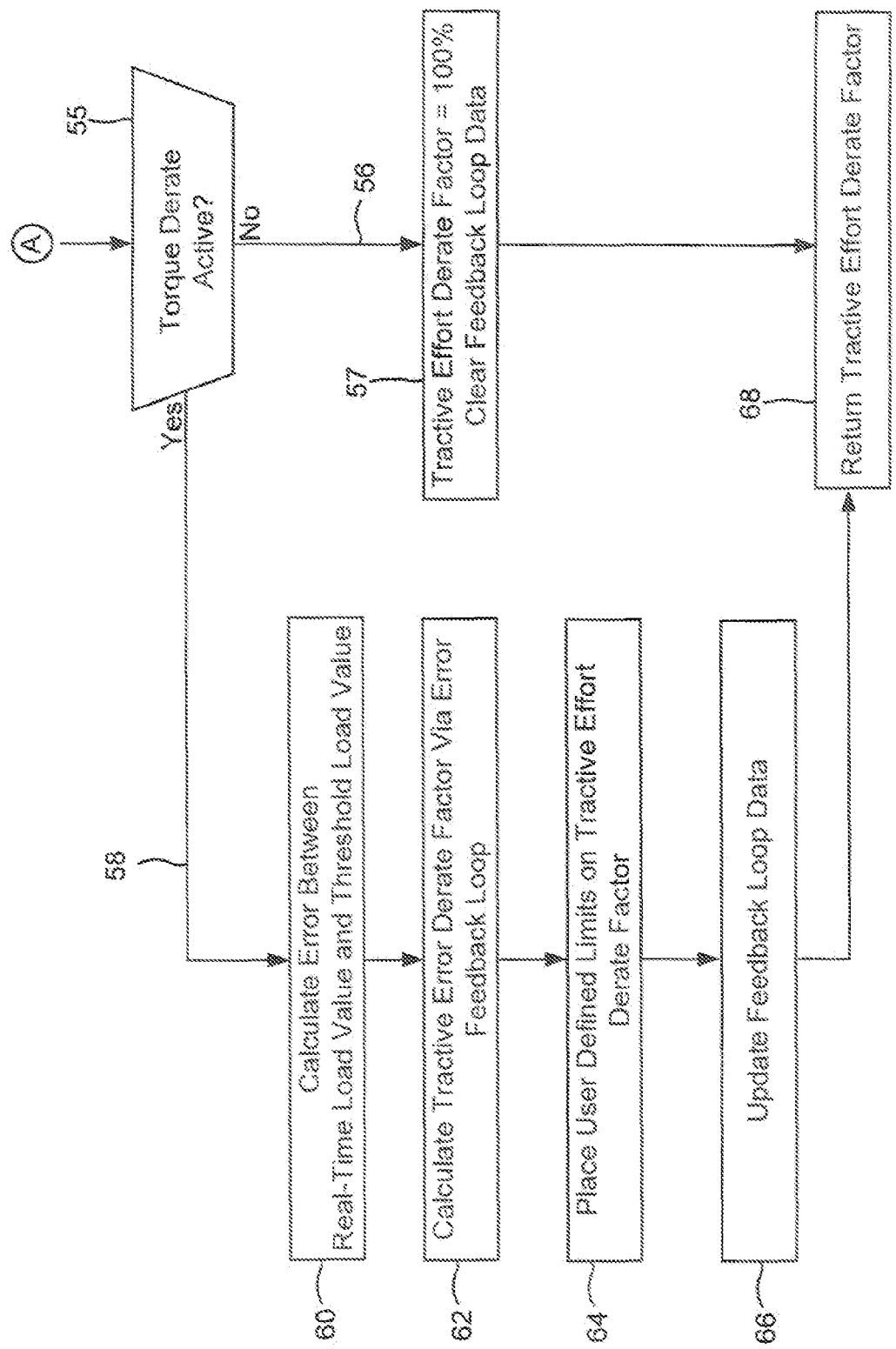

Referring now to FIGS. 2A and 2B, an embodiment of the method of the present invention for operation of work machine 10 will be described in greater detail. At block 40, a user defined threshold load value is set, such as by being entered through a keypad connected with VCU 28 and stored in a memory.

One possibility for setting the threshold load value is to match this value with a maximum torque/load value on a torque curve for a given IC engine. For example, for a given IC engine, it is common to use a predefined torque curve with torque (load) as a function of engine speed. The torque curve can be stored in a memory or dynamically determined using a given mathematical function. Such torque curves are well known in the art and thus not shown herein for purposes of brevity. The torque curve used in operation defines the maximum output torque at a given engine speed. Thus, a number of maximum output torques are possible, each corresponding to a different operating speed of IC engine 12. The torque or load is the rotational effort of the crankshaft of the engine, i.e., the output power. The engine speed is typically determined by the position of the throttle, either electronic or mechanical. For the corresponding engine torque, the engine control unit (ECU) 24 controls operation of one or more engine control parameters to achieve the desired output torque, which is at or under the maximum torque for that operating speed. For example, the ECU 24 can control an exhaust gas recirculation (EGR) variable in an EGR system (such as a diluent-to-air ratio), a controllable element in a variable geometry turbocharger (VGT), a fuel injection timing, and/or a fuel pressure. It is thus possible to thus set the threshold load value to correspond to a maximum load value on a torque curve at a given operating speed, or a decimal amount of the maximum load value.

At decision block 42, a number of criteria are ascertained to determine if a torque output from IVT 14 should be derated. First, if a real-time load value on IC engine 12 is greater than the threshold load value inputted at block 40, then this is an indication that the torque output from IVT 14 should be derated. The real-time load value may be sensed or inferred from a number of techniques, such as by sensing a real-time fuel flow rate into IC engine 12. Other factors considered at decision block 42 include gear selector requirements, vehicle speed requirements, and other miscellaneous requirements.

If a decision is made in decision block 42 to activate the torque derate (line 44), then the torque derate is simply activated (block 46). Otherwise, if the torque derate is not activated (line 48), a decision is made whether to deactivate the torque derate function (decision block 50). That is, even though a decision is made not to activate the torque derate in decision block 42, the torque derate could in fact already be in an activated state from a previous logic loop. Decision block 50 again checks operating parameters including gear selector requirements, vehicle speed requirements, and other miscellaneous requirements to determine if the torque derate should be deactivated. If so, then the torque derate is simply deactivated (block 52); otherwise, control passes via line 54.

At decision block 55, a check is made whether the torque derate is active or deactive. If the torque derate is deactive (line 56), then IVT 14 is not derated and 100% tractive effort is applied to the output of IVT 14 (block 57). On the other hand, if the torque derate is active (line 58), then the torque derate scaling factor is calculated based upon the difference between the real-time load value and the threshold load value (blocks 60 and 62). Any user defined limits on the torque derate scaling factor are considered in block 64, the feedback loop data is updated accordingly at block 66, and the logic ends at block 68 with the tractive effort derate scaling factor.

Having described the preferred embodiment, it will become apparent that various modifications can be made without departing from the scope of the invention as defined in the accompanying claims.

The invention claimed is:

1. A work machine, comprising:
an internal combustion (IC) engine;
an infinitely variable transmission (IVT) coupled with said IC engine;
at least one sensor providing an output signal representing a real-time load value on said IC engine; and
at least one electrical processing circuit configured for controlling an output of said IVT, dependent upon a threshold load value for said IC engine and said real-time load value for said IC engine, said threshold load value corresponds to a maximum allowable load value on a torque curve for said IC engine for a given operating condition of said IC engine, said threshold load value is defined by a user of the work machine, said maximum allowable load including both drivetrain loads and at least one external load on said IC engine.

2. The work machine of claim 1, wherein said at least one electrical processing circuit includes an engine control unit (ECU) associated with said IC engine, and a transmission control unit (TCU) associated with said IVT, said ECU providing an output signal to said TCU representing said real-time load value, said TCU controlling said output of said IVT dependent upon a comparison between said threshold load value and said real-time load value.

3. The work machine of claim 1, wherein said TCU controls said output of said IVT further dependent upon a commanded ground speed of the work machine, and a commanded direction of the work machine.

4. The work machine of claim 1, wherein said TCU determines an IVT torque command for controlling said output of said IVT.

5. The work machine of claim 1, wherein said ECU is in communication with said TCU via a controller area network (CAN) bus.

6. The work machine of claim 1, wherein said maximum allowable load is associated with a maximum torque at a given operating speed for said IC engine.

7. The work machine of claim 1, wherein said at least one external load includes at least one hydraulic load placed on said IC engine.

8. The work machine of claim 1, wherein said at least one sensor senses at least one of an IC engine fueling rate, an IC engine load factor, and a percent torque on said IC engine.

9. The work machine of claim 1, wherein said work machine comprises one of a construction work machine, an agricultural work machine, a forestry work machine, a mining work machine, and an industrial work machine.

10. A method of operating a work machine including an internal combustion (IC) engine coupled with an infinitely variable transmission (IVT), said method comprising the steps of:
    establishing a threshold load value, the establishing of the threshold load value is defined by a user of the work;
    determining a real-time load value associated with the IC engine;
    comparing said real-time load value with said threshold load value, wherein said threshold load value corresponds to a maximum allowable load value on a torque curve for the IC engine for a given operating condition of the IC engine, said maximum allowable load including both drivetrain loads and at least one external load on the IC engine; and
    controlling an output of the IVT, dependent upon said comparing step.

11. The method of operating a work machine of claim 10, further comprising at least one electrical processing circuit, wherein said at least one electrical processing circuit includes an engine control unit (ECU) associated with said IC engine, and a transmission control unit (TCU) associated with, said IVT, and including the steps of:
    outputting an output signal from said ECU to said TCU representing said real-time load value; and
    controlling said output of said IVT using said TCU, dependent upon said comparing step.

12. The method of operating a work machine of claim 11, wherein said TCU controls said output of said IVT further dependent upon a commanded ground speed of the work machine, and a commanded direction of the work machine.

13. The method of operating a work machine of claim 10, wherein said at least one external load includes at least one hydraulic load placed on the IC engine.

14. The method of operating a work machine of claim 10, wherein said step of determining said real-time load value includes sensing at least one of an IC engine fueling rate, an IC engine load factor, and a percent torque on said IC engine.

* * * * *